United States Patent [19]

Stava

[11] Patent Number: 4,972,064
[45] Date of Patent: Nov. 20, 1990

[54] APPARATUS FOR SHORT CIRCUITING ARC WELDING

[75] Inventor: Elliott K. Stava, Brecksville, Ohio

[73] Assignee: The Lincoln Electric Company, Cleveland, Ohio

[21] Appl. No.: 404,769

[22] Filed: Sep. 8, 1989

Related U.S. Application Data

[60] Division of Ser. No. 270,766, Nov. 14, 1988, Pat. No. 4,866,247, which is a continuation-in-part of Ser. No. 135,832, Dec. 21, 1987, abandoned, which is a continuation-in-part of Ser. No. 940,580, Dec. 11, 1986, Pat. No. 4,717,807.

[51] Int. Cl.$^5$ .............................................. B23K 9/10
[52] U.S. Cl. .......................... 219/130.21; 219/137 PS
[58] Field of Search .................... 219/130.21, 137 PS, 219/130.1

[56] References Cited

U.S. PATENT DOCUMENTS

| | | | |
|---|---|---|---|
| 4,020,320 | 4/1977 | Pijls | 219/137 PS |
| 4,469,933 | 9/1984 | Mizuno et al. | 219/137 PS |
| 4,485,293 | 11/1984 | Tabata et al. | 219/137 PS |
| 4,665,299 | 5/1987 | Iwata | 219/137 PS |
| 4,717,807 | 1/1988 | Parks et al. | 219/130.21 |
| 4,785,149 | 11/1988 | Gilliland | 219/130,1 |

*Primary Examiner*—Clifford C. Shaw
*Attorney, Agent, or Firm*—Body, Vickers & Daniels

[57] ABSTRACT

An improvement in a short circuiting arc welding apparatus comprising a single D.C. power supply causing a welding current to pass through a welding wire extending from a holder and between said wire and workpiece at a molten metal pool on the workpiece, wherein the current flows in response to an arc voltage and the welding wire is subjected to a succession of welding cycles. Each of the welding cycles includes an arcing condition during which said wire is spaced from the pool and the energy applied to said wire exceeds a given value raising the temperature at the end of the wire to a molten temperature to form a molten metal ball on the end of the wire and a short circuit condition during which the molten metal ball on the end of the wire first contacts said molten metal pool and then transfers from the wire to the workpiece by a necking action breaking the molten metal ball from the wire to initiate an arc in a subsequent welding cycle. The welding cycles have a generally fixed frequency of repetition. The improvement comprises providing the power supply with a chopper circuit for applying a succession of input current pulses across the wire and workpiece at a pulse frequency substantially greater than the generally fixed frequency of repetition of the welding cycles and a pulse width changing circuit for adjusting current flow between the wire and the workpiece many times during each of the welding cycles.

37 Claims, 3 Drawing Sheets

APPARATUS FOR SHORT CIRCUITING ARC WELDING

This application is a divisional of prior copending application Ser. No. 270,766 filed Nov. 14, 1988, now U.S. Pat. No. 4,866,247 which is a continuation-in-part of prior copending application Ser. No. 135,832 filed Dec. 21, 1987, now abandoned, which is in turn a continuation-in-part of prior application Ser. No. 940,580 filed Dec. 11, 1986, now U.S. Pat. No. 4,717,807.

This invention relates to the art of arc welding using a consumable electrode and more particularly to an improved apparatus and method of short circuiting arc welding.

INCORPORATION BY REFERENCE

The present invention relates to an improvement in spatter control systems of the general type described in applicant's prior application Ser. No. 135,832 filed Dec. 21, 1987 and U.S. Pat. No. 4,717,807 issued Jan. 5, 1988. The prior abandoned application and the issued patent are incorporated by reference herein as background information and for their discussion of concepts in the spatter control area to which the present invention is specifically directed. Prior copending application Ser. No. 270,766 filed Nov. 14, 1988 is also incorporated by reference to disclose in detail aspects of the present invention, which is a division of this prior copending application. In addition, Pijls et al U.S. Pat. No. 4,020,320 relating to short-circuit arc welding with a constant bead, is also incorporated by reference herein.

BACKGROUND

In recent years, a substantial amount of effort has been devoted to improving short circuiting arc welding by controlling portions of a welding cycle constituting a short circuit condition followed by an arcing condition. During the short circuit condition, a molten metal ball formed on the end of the advancing welding wire engages the molten metal pool on the workpiece causing a high current flow through the consumable welding wire and molten metal ball. This short circuit condition is terminated by an electrical pinch action causing the metal forming the molten ball on the wire to electrically constrict and then break away from the welding wire in an explosion type action often referred to as a "fuse" or "the fuse". Controlling current flow during the short circuit portion of the welding cycle is accomplished by the power supply control circuit. In addition, a premonition circuit is usually provided so that a given increase in dv/dt signals the imminent formation of the fuse. Consequently, the welding current can be dropped to a background level $I_B$ or lower immediately before the fuse occurs. In this fashion, the energy of the fuse during each welding cycle is drastically reduced. This reduces spatter at the termination of the short circuit condition. Various circuits for controlling the current flow during the short circuit portion or condition of the welding cycle are known in the art as spatter control circuits since the fuse is considered to be the primary source of spatter during short circuiting arc welding. In applicant's copending applications, incorporated by reference herein, other spatter producing dynamics of the welding process were recognized and prevented or modified by novel control concepts. One concept was to provide a high energy pulse following a slight time delay after the fuse so that the arcing condition subsequent to the fuse could be initiated by a high energy current pulse sometimes referred to as a "plasma boost" pulse. By using a high energy plasma boost current pulse immediately upon initiation of an arcing condition in the welding cycle, melting by anode heating at the tip of the welding wire being fed toward the molten metal pool on the workpiece occurred rapidly. This rapid melting allowed formation of a molten metal ball on the end of the wire of uniform size which was then moved toward the pool of molten metal as the wire was fed toward the workpiece. After the plasma boost pulse of current, a background current $I_B$ was passed through the arc to maintain the molten condition of the molten ball. By controlling the current and using a fixed time for the plasma boost pulse, the energy in the plasma boost pulse was regulated. The end of the wire was melted to form a molten metal ball having a somewhat uniform size based upon an amount of energy applied during the plasma boost current pulse. Thereafter, the arc was operated at a background current level maintaining a molten condition until the short circuit occurred.

Utilizing the first of these prior concepts, which have indeed substantially reduced spatter, a constant voltage control circuit during the plasma boost pulse caused a high current flow during the pulse. This tended to drive the pool away from the inwardly moving molten metal ball. Should the pool be shifted by the energy of the arc, a slight contact could occur at a location spaced from the center of the arc. This short during the plasma boost pulse caused a relatively large spatter event. Thus, using a constant voltage for the plasma boost current pulse allowed a high current to drive the pool away from the ball which, by fluid dynamics, sometimes tended to cause a wave effect resulting in momentary shorts. To overcome this difficulty, a variable voltage power control circuit has been suggested to maintain a constant current during the plasma boost current pulse. This concept increased the frequency of random shorting during the arcing condition, but each short had a lesser amount of energy to be released. The variable voltage concept employing a constant current condition allowed momentary shorts of less energy. In summary, using constant current or constant voltage during the plasma boost cycle either increased the frequency of momentary shorts during the arcing condition or their ferocity.

By using a plasma boost pulse having a fixed time, a different amount of energy was introduced into the molten metal ball as the stick-out of the consumable electrode or welding wire varied. Thus, prior systems employing fixed time in the plasma boost current pulse could be used for automatic welding; however, semi-automatic welding wherein manual manipulation changed the extension presented difficulty. The plasma boost current pulse sometimes did not create enough heating on the end of the wire for melting. This caused stubbing. In addition, the duration of the welding cycle was not constant over long periods of time since there was substantial variations in the initiation of the short circuit condition of the individual cycles.

THE INVENTION

The present invention relates to an improvement in short circuiting arc welding which results in a substantially constant welding cycle time, reduced spatter and automatic compensation for variable extension or stick-out during semi-automatic welding in the short circuiting mode as well as a unique concept for controlling spatter control circuits.

In accordance with the present invention, there is provided an improved apparatus or system for short circuiting arc welding of the type using a DC power supply for causing a welding current of different levels to pass through the welding wire extending variable distances from an electrode holder and between the wire and the workpiece at the molten metal pool on the workpiece. The current flowing during the welding process is in response to the voltage between the holder and the workpiece. In accordance with the invention, there is means for applying a preselected energy to the welding wire during a selected portion of each arcing condition of the welding cycle where the preselected energy exceeds the given value of energy necessary for melting the end of the wire preparatory to forming a molten metal ball of a given size for short circuiting metal transfer. The selected portion of each arcing condition during which a constant energy is applied is the fixed time plasma boost current pulse together with an additional plasma current pulse. This plasma pulse is terminated at an adjusted time to create a constant energy input to the wire during the plasma boost and subsequent plasma portion of the welding cycle. Thus, during each welding cycle a selected constant amount of energy is applied to the wire for heating of the wire during each cycle. Such wire heating is divided into resistance heating by current flow through the wire from the holder to the end of the wire and anode heating at the end of the wire by the effective arc current. Such anode heating contributes a majority of the melting energy applied to the wire during each welding cycle. As the extension or stick-out increases, a larger portion of the heating per cycle is resistance heating caused by current flow through the welding wire. By employing a fixed constant energy input during the arcing condition for each welding cycle, the system automatically compensates for different stick-out conditions. As the stick-out increases, more heating is by resistance heating in the wire. As the stick-out decreases, less heating is by resistance heating of the wire. In all instances, a constant energy is applied so that there is automatic adjustment of the amount of $I^2R$ heating preparatory to the wire reaching the end portion where it is melted into a ball. Since the welding cycles occur between 30–100 cycles per second, each increment of advancing wire, defined as the amount of advance during a given welding cycle, includes an accumulation of heat energy applied to the increment during all cycles prior to the time the increment reaches the bottom of the wire. Any change in stick-out occurs at a substantially lower rate than the accumulation of heat energy during each welding cycle in individual increments of the advancing wire. Since the welding operation is substantially faster than the rate of any change in stick-out or extension from the holder, each increment essentially has the energy which when combined with the actual energy of the anode heating during each cycle results in a fixed energy input to the last increment of wire being actually melted. Changes in stick-out are gradual in comparison to the normal operation of the system so that a constant energy is developed in the molten metal ball during each welding cycle. The ball is a fixed size and spatter is reduced by concepts which are applicable to semi-automatic operation.

In accordance with a more limited aspect of the invention, the energy controlled current pulse has a first occurring portion, known as the plasma boost portion, employing a relatively high current level and a second occurring portion, known as the plasma portion, employing a lower second current level substantially above the background current. The plasma boost portion of the arcing cycle has a fixed time so a selected energy is applied during this portion of the welding cycle. However, the plasma portion used to finalize the melting of the ball, after the high energy plasma boost pulse of current, has a variable length which is terminated during each cycle at a time to produce a fixed actual energy applied to the wire during each welding cycle. By using this concept, changes in the length of the extension occurring at the rate experienced during welding do not change the total energy consumed by the wire by the last increment being melted for forming the molten metal ball on the end of the wire preparatory to the short circuit condition in the welding operation.

To terminate the plasma portion of the welding cycle during the arcing condition there is provided means for creating a watt signal as the instantaneous product of the arc voltage and welding current for the welding process. By integrating this signal from the start of the plasma boost pulse, the accumulated totalized energy value reaches a preselected level which is employed for terminating the high plasma current. Thereafter, a low background current is used to maintain the molten metal ball until it reaches the molten metal pool on the workpiece for creating the short condition of the welding cycle. Thus, the invention employs a high current plasma boost pulse followed by a plasma portion, also at high current, until a fixed amount of energy has been accumulated during a welding cycle. When this occurs, the energy required to melt the ball has been reached. The background current maintains the size and temperature of the ball.

As the extension gradually changes, the amount of energy consumed by resistance heating through the wire changes. This phenomena does not affect the ultimate heating of the end of the wire. As more heating occurs in the wire advancing toward the workpiece, less heating occurs by anode heating by the arc. In accordance with the invention, the heating is terminated at a fixed energy level which is the energy level just above the energy necessary for converting the last increment of metal into a molten metal ball. For instance, if the volume of metal requires 7.2 Joules for melting the last increment, the energy cutoff employed in the present invention would be slightly greater than that amount, such as about 7.25 Joules.

In accordance with another aspect of the present invention, the D.C. power supply for controlling the current flow during the welding cycle employs a high frequency pulsing circuit, such as a pulse width modulator D.C. chopper operated at a high frequency, such as greater than 10 KHz and, preferably, approximately 20 KHz. In this fashion, all aspects of the welding cycle are controlled and updated many times during each welding cycle. There is no appreciable lag in compensating for gradual changes in extension or stick-out. The total energy directed to the ball at the end of the wire preparatory to short circuiting is fixed. This constant energy value does not change as gradual stick-out changes. In view of the high frequency of the input power control device employed in accordance with the preferred embodiment of the present invention, real time operation creates the same energy in the melted, last increment irrespective of gradual changes in the number of increments constituting the extended portion of the welding wire.

In accordance with another aspect of the invention, the high energy plasma boost current pulse is controlled to produce a constant watt condition for at least a major portion of the plasma boost pulse. This overcomes the difficulties experienced in a constant current or constant voltage mode of operation and is done by employing the system used for controlling the energy during each welding cycle. This system creates a watt signal which adjusts the current pulses gated by the pulse width modulator D.C. chopper. This concept results in a constant watt condition during the plasma boost pulse. Thus, the plasma boost pulse is a constant watt pulse having a fixed time. The energy cutoff time is controlled during the subsequent arc plasma mode of operation.

In accordance with a more specific aspect of the present invention, there is provided a unique driving system for the spatter control circuit wherein the individual welding cycles have a generally fixed frequency of repetition, such as 30–100 welding cycles per second. The power supply for the spatter control includes means for applying a succession of input current pulses across the wire and workpiece at a pulse frequency substantially greater than the generally fixed frequency of repetition of the welding cycles and pulse width changing means are provided for adjusting the current flow between the wire and workpiece many times during each of the welding cycles. In practice, the repetition is approximately 20 KHz so that the actual current flow during the welding cycle is adjusted at the rate determined by the period of a 20 KHz control signal. In this manner, accurate control is maintained without substantial interference with circuit parameters. When using this concept, a relatively low inductance is employed across the output leads of the power supply system. To prevent high current flow during the pinch cycle, a rapidly operated power switch is opened causing the current flow to occur across or through an appropriate snubber circuit.

In accordance with another aspect of this feature of the invention, the pulse width change means comprises a feedback control means for changing the pulse width of the input current pulses in the direction to maintain a preselected electrical characteristic at a feedback junction. Selectively actuated circuit means are connected to this same junction tending to change the electrical condition of the feedback junction during various portions of each of the welding cycles. In this fashion, the feedback junction can be shifted during various portions of the welding cycle to cause the current control to follow a preselected pattern to accomplish the electrical parameters of the spatter control circuit as previously described. In accordance with this aspect of the invention, a variety of spatter control circuits can be operated by the unique driving concept of the present invention.

As a summary, the driving circuit for the spatter control system or spatter control circuit includes a pulse width modulator that is adjusted rapidly, such as at a frequency of 20 KHz. The width of the individual pulses during the various portions of the welding cycle are controlled by the feedback circuit which attends to maintain a preselected condition at a selected junction or control point. In this manner, this control point can be biased and subject to various electrical parameters during each welding cycle to adjust the profile of the welding cycle in accordance with any plan. Thus, the PINCH cycle can be controlled by current and have a different current during different portions. The plasma boost can be controlled by a constant wattage feedback arrangement with a preselected profile. Thus, by using the high frequency and the selectively adjustable control feature of this aspect of the invention, a variety of individual welding cycles can be preprogrammed and controlled.

In accordance with the preferred embodiment of the invention, the selectively actuated control circuit for controlling the feedback network using the pulse width modulator concept includes a feedback signal arrangement and a command signal arrangement which have opposite polarity electrical characteristics. By selecting one or more command signals and a selected feedback signal, these signals can be added at the appropriate junction or control point to cause the rapidly generated current pulses during the welding cycle to be profiled in accordance with the dictates of the preselected electrical characteristics imparted to each welding cycle to control the spatter. In accordance with the preferred embodiment, a current feedback can be employed with the command signals for controlling various portions of the welding cycle or a wattage feedback can be employed for this purpose. Indeed, during certain portions of the welding cycles, such as the plasma boost portion, the feedback signal can be a wattage signal to control the wattage during this portion of the welding cycle. During other portions of the welding cycle, such as a PINCH portion, the feedback signal can be selectively changed to a current signal. During other portions of the cycle the feedback signal can be controlled either by feedback of the sensed current or feedback by the sensed wattage. Of course, a voltage feedback could be employed in practicing the invention.

The invention is implemented by a fixed high frequency in controlling the current with the pulse width of the current pulses being changed by a pulse width modulator chip. Of course, in some instances the same result can be accomplished in the same way by implementation of a variable frequency circuit. At this juncture in technology, this type of control is not preferred.

The primary object of the present invention is the provision of a unique driving system for spatter control circuits wherein the current is provided to the system in a large number of individual current pulses during each welding cycle.

A still further aspect of the present invention is the provision of a driving system for spatter control circuits, the type defined above, which system has a unique feedback circuit allowing adjustments of various portions of the welding cycle in accordance with different control parameters to maintain control over current flow during each portion of the welding cycle for a short circuit in an arc welding operation.

These and other objects and advantages will become apparent from the following description taken together with the accompany drawings.

PREFERRED EMBODIMENT OF THE PRESENT INVENTION

Figure 1:
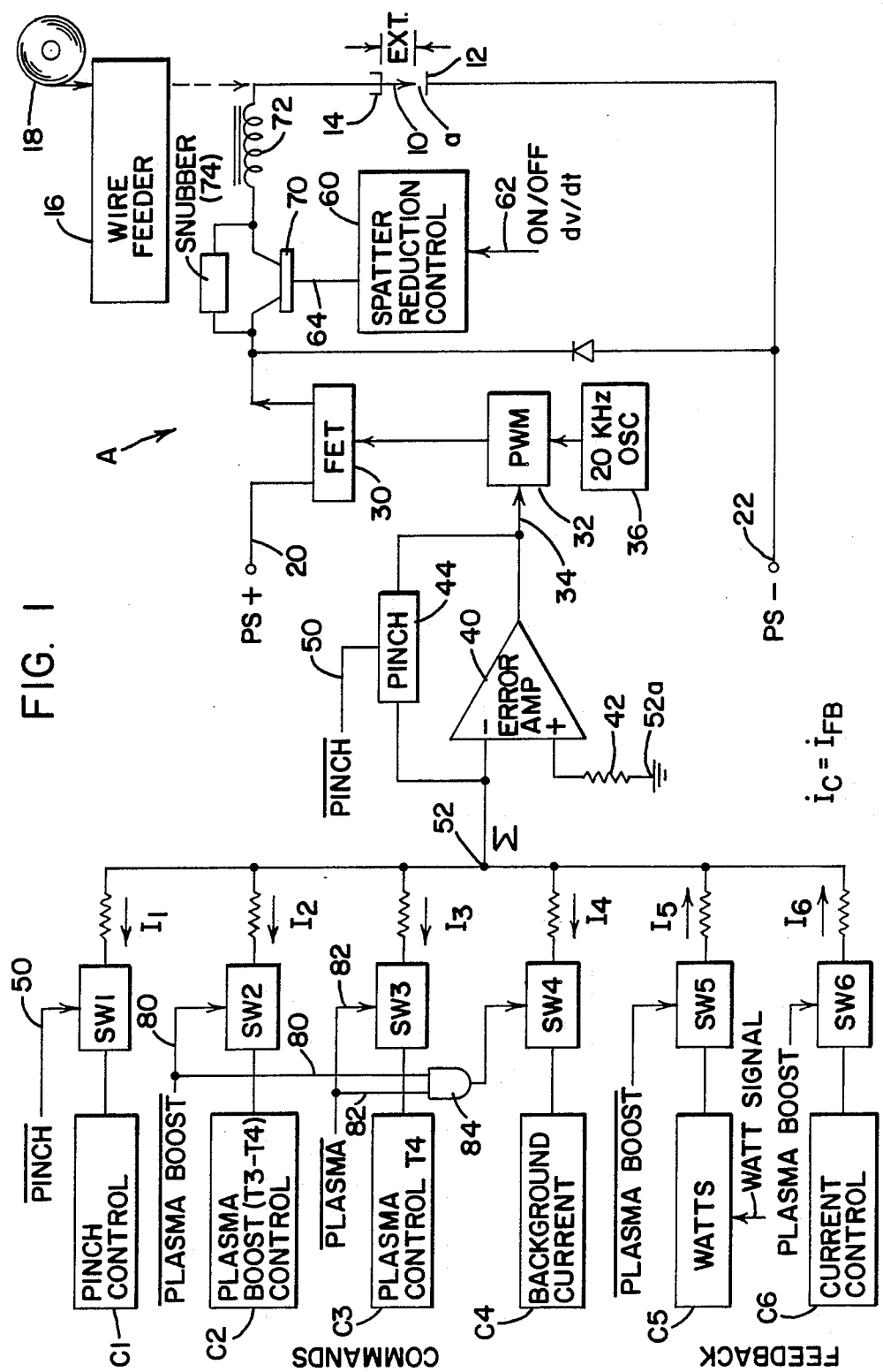
FIG. 1 is a combined block diagram and schematic wiring circuit showing the preferred embodiment of the present invention.

Referring now to the preferred embodiment of the invention only, and not for the purpose of limiting same, FIG. 1 shows apparatus A for short circuiting welding using control circuits to accomplish reduced spatter in a manner described in prior application Ser. No. 135,832 filed Dec. 21, 1987. The present invention relates to an improvement in short circuiting arc welding of the type performed by apparatus A with a novel concept performed by a preferred circuit shown in FIGS. 1 and 3. Apparatus A, as shown in FIG. 1, is illustrative in nature and includes a power supply input scheme using various distinct current controls for creating separate current portions of a cycle for short circuiting arc welding. Welding wire 10 is spaced from workpiece 12 while being supported in an electrical connector or holder 14. Wire 10 can be driven through holder 14 by an appropriate wire feeder 16 from a supply spool 18 at a rate determined by the operator. Holder 14 is connected to one terminal of a D.C. power supply PS. The amount of wire extending from the holder and above arc a defines the extension or stick-out for welding wire 10. Power supply PS includes a positive output terminal 20 and a negative output terminal 22 in accordance with standard practice. Power switch 30 is cycled at approximately 20 KHz by pulse width modulator 32 of standard design having a control line 34 and a driving oscillator 36. Consequently, the voltage on the control line 34 indicates the width of the 20 KHz current pulses allowed to pass through switch 30. In this manner the welding current through welding wire 10 and across arc a is controlled by the various input control circuits C1–C6 used separately or jointly as will be explained. The pulse width controlling voltage on line 34 is the D.C. voltage level at the output of an error amplifier 40 appropriately biased by resistor 42. An override or parallel circuit 44 is operated in response to the logic on inverted PINCH line 50. The input of both error amplifier 40 and circuit 44 is the voltage at summing junction 52 which is controlled by a series of switches SW1–SW6 at the output side of control circuits C1–C6. The upper circuits C1–C4 are used in conjunction with lower circuits C5, C6 to feed and draw current from junction 52 so the current drawn from the error amplifier controls the voltage on modulator 32. Background current is maintained at low level $I_B$ by joint closing of switches SW4, SW6. In accordance with prior practice, spatter control circuit 60 is operated in response to an impending fuse by q signal in line 62. This fuse signal is created by a dv/dt premonition circuit so that the logic on output line 64 will render power switch 70 non-conductive immediately before a fuse is created during a short circuit condition. Operation of switch 70 changes the flow of welding current through choke or inductor 72 from a high level current through switch 70 to low level current through a snubbing circuit 74. As the short circuit portion of a cycle progresses, a standard dv/dt exceeds a set value, indicative of an impending fuse, the logic on line 62 shifts. The voltage of line 64 renders switch 70 non-conductive. The welding current from switch 70 is shifted to a low level to reduce the energy released by the fuse to reduce spatter. This concept does not form a part of the improvement constituting the present invention which is operative during the arc condition of the welding cycle.

Figure 2:
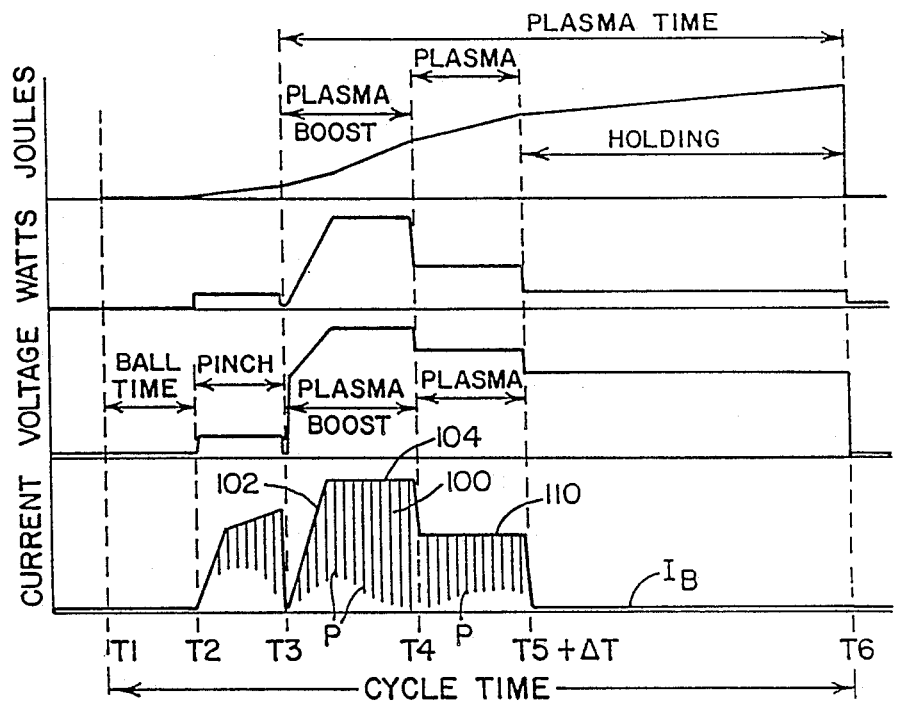
FIG. 2 is a series of graphs together with a table of features employed in an embodiment of the present invention; and, FIG. 3 is a partial wiring diagram illustrating the preferred embodiment of the present invention for creating the amount of current directed to the welding wire during a single welding cycle.

The width of the high frequency pulses allowed to pass through switch 30 by the output of pulse width modulator 32 is determined by the voltage at summing junction 52, which voltage is controlled by switches SW1–SW6 operated to control the welding current at various portions of the total welding cycle best shown in FIG. 2. The welding cycle is illustrated as extending between positions T1–T6. Variations can be made on this scheme of operation in accordance with the preferred embodiment of the present invention. To illustrate the function of switches SW1–SW6, the cycle time or cycle is assumed to start at time T1. At that time, a molten metal ball B is formed on the end of wire 10 and the wire is moving toward the molten metal pool formed on workpiece 12. Since the plasma boost pulse and plasma pulse are not yet created, the logic on input lines 50, 80, 82 of AND gate 84 deactivate switches SW1, SW2, SW3 and SW5 while activating switches SW4 and SW6. Consequently, the background current control C4 is operative. This control circuit combines with the output of current control switch SW6 driven by current control circuit C6. The pulse width of the 20 KHz pulses through switch 30 are thus at a background current level $I_B$. Detection of a short causes a logic on inverted PINCH line 50 causing switches SW1 and SW6 to take over control of the current flow through the PINCH modified feedback circuit 44. The pulse width modulator 32 is controlled by circuits C1, C6 during the short circuit condition. A high welding current tends to flow due to the short condition. The pulse width modulator attempts to limit the current magnitude as illustrated in the PINCH portion of FIG. 2. The illustrated and preferred embodiment has two distinct slopes; however, other forms of the PINCH pulse could be controlled by circuit C1. As soon as a fuse is about to occur, the logic in line 62 changes. This opens switch 70 causing the current to be drastically reduced through use of snubber 74. This is illustrated at time T3 in FIG. 2. The background current $I_B$ can be the same as this low level; however, in the illustrated embodiment, $I_B$ is controlled by circuit C4 and is not identical to the current at time T3. Immediately thereafter, a standard plasma boost current pulse 100 is created. This pulse is controlled by switch SW2 closed in response to a logic change in line 80. Since the PINCH condition does not remain, switch SW1 is off and bypass circuit 44 acts only as a current drain to maintain the current at point 52 at ground. Thus, during the plasma boost current pulse condition 100, switch SW2 allows circuit C2 to control pulse width modulator 32 for controlling the welding current pulses through switch 30. In the illustrated embodiment, plasma boost current pulse 100 includes a leading edge 102 controlled by the plasma boost control C2 and then an upper portion 104 also controlled in the circuit C2. In the preferred embodiment of the invention, the upper portion 104 is a constant watt portion instead of a constant current control illustrated in FIG. 2. When apparatus A is to control the plasma boost pulse with a constant power, switch SW5 is closed so that the instantaneous watt signal is monitored by circuit C5 which produces an input to junction 52 through switch SW5. During constant power operation current control circuit C6 is deactivated by a logic in line 80 that opens switch SW6.

In accordance with the illustrated embodiment of the invention, during the standard plasma boost current pulse, the current flow through switch 30 is controlled by circuits C2, C5 to produce a constant instantaneous watt, which is updated at the sampling rate of 20 KHz. During the other portions of the welding cycle, watt signal control circuit C5 is inoperative so that there is, then, a current control through switch SW6 and input circuit C6. At a fixed time T4, plasma boost current pulse 100 is terminated by control circuit C2. Current control is shifted from circuit C5 to circuit C6. At this time, switch SW3 applies the output of plasma control circuit C3 to modulator 32 so that the high current flow started at time T3 when the arcing condition comes into existence following a fuse includes a first occurring plasma boost portion 100 and a second occurring plasma portion 110. The high current of the plasma portion controlled by circuit C3 is terminated at time T5. The integrated area of pulses 100, 110 is the total energy applied to wire 10 during the welding cycle between times T1–T6. After the high current plasma pulse 110, switch SW4 is again closed so that background current control circuit C4 takes over operation of error amplifier 40.

In summary of the operation of a welding cycle, at time T2 there is a short circuit when the molten metal ball contacts the molten metal in the pool on workpiece 12. When that occurs, a PINCH control circuit C1 controls switch 30 through switch SW1 and parallel branch or circuit 44. Direct control of the current flow is needed to limit flow during the short condition. This is accomplished by modification of circuit 44. An imminent fuse causes a signal in line 62. This terminates the PINCH cycle at time T3. Switch 70 is opened and snubber 74 is placed in series with choke 72. Thereafter, the arcing condition occurs which commences with a plasma boost current pulse 100 followed by a plasma current pulse 110. The plasma boost current pulse 100 has a fixed time T3–T4 and the plasma current pulse 110 is terminated at time T5. In accordance with the invention, the energy provided for the welding operation during pulses 100, 110 is constant. This is accomplished by adjusting the time T5 indicated to be a subtraction or addition to time T5. As will be explained later, the termination of a plasma pulse, or second occurring portion of the total current pulse between times T3–T5, is done so that a constant energy is employed during each arcing condition of the welding cycle. The energy produced during the PINCH and background cycles is not calculated. It is disregarded since this energy does not provide a control function and is somewhat minor in that it only creates resistance heating in wire 10 for a relatively short period of time and at low power.

FIG. 2 illustrates the current, voltage, watts and accumulated Joules in somewhat straight line fashion for illustrative purposes. In addition, the HOLDING portion of the welding cycle, occurring after the two high plasma current portions of the cycle, could include a third high current energy supply pulse which combines with current pulses 100, 110 to create the desired amount of accumulated energy during the arcing condition. When that occurs, pulses 100 and 110 would both have a fixed time. The holding cycle would then have a further current pulse which would cause the circuit to shift to the background level at time T6. In that instance, time T6 is adjusted to control the total energy applied to the wire during the arcing condition. In the preferred embodiment of the invention, only two current pulses form the high current used to heat wire 10 during the arcing condition. However, a third high current condition could exist which is labeled "holding" in the upper graph of FIG. 2. In the preferred embodiment, leading edge 102 of pulse 100 is essentially vertical and portion 104 is horizontal, but controlled at a constant power by adjusting the current and allowing the voltage to fluctuate accordingly. Only a watt control is used. The graphs of FIG. 2 are only representative in presentation. Vertical lines P in the lower current graph of FIG. 2 illustrate the 20 KHz frequency of switch 30. Switch 30 operates many times during a welding cycle between times T1–T6. Thus, accurate and real time control is exercised over the current flow from power supply PS through switch 70 to the welding station determined by welding wire 10 of workpiece 12. As so far described, except for the adjustment in time T5 when two high current pulses are employed or time T6 when three high current pulses are employed, the spatter control concept of FIG. 2 as performed by the schematically illustrated apparatus A is taught by the prior applications incorporated by reference herein.

Figure 3:
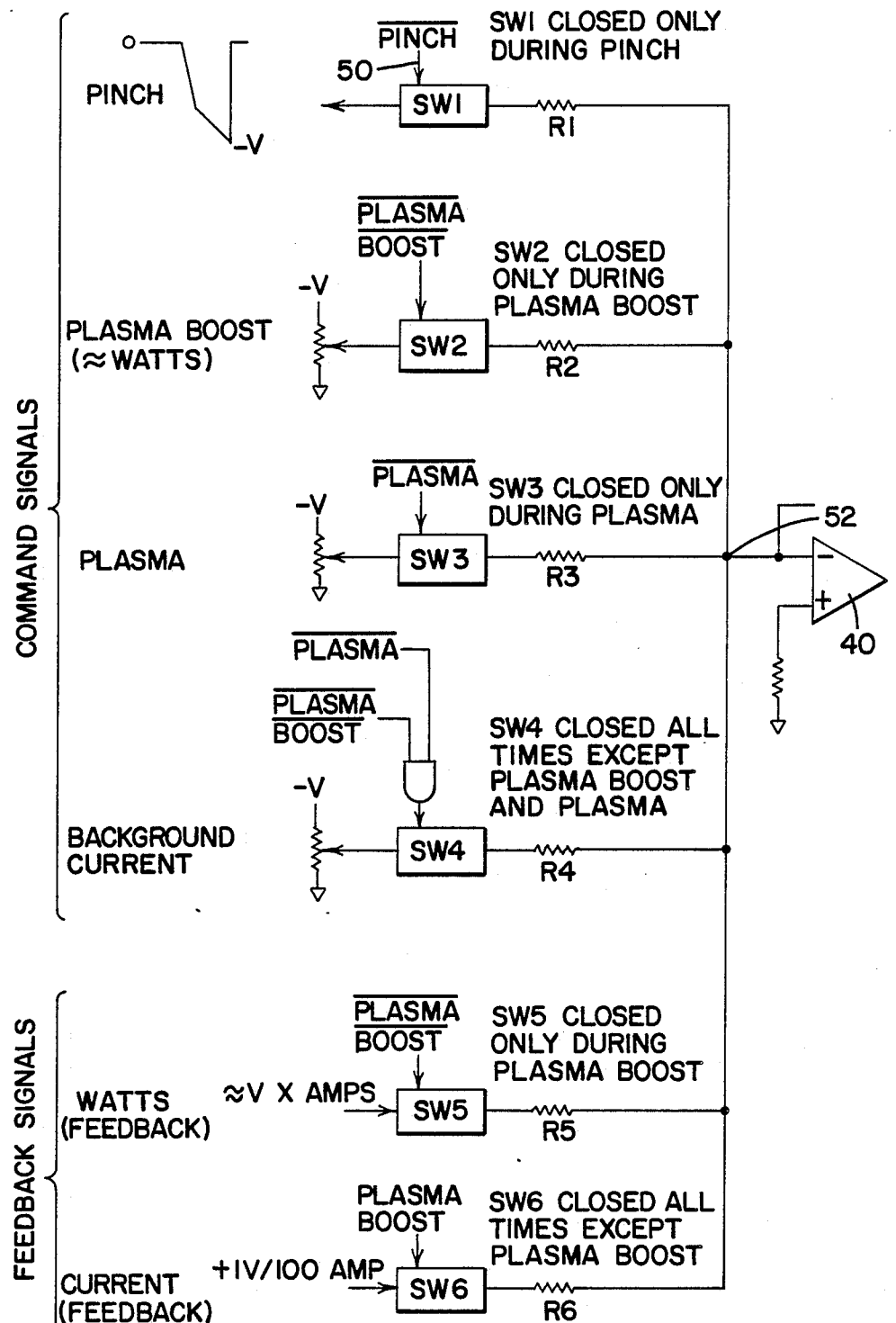

Referring now to FIG. 3, more details are illustrated with respect to the selectively operated input circuit for summing junction 52 at the virtual ground terminal 52a of error amplifier 40. Air amplifier 40 compares the command inputs from signal creating means C1, C2, C3 and C4 to the feedback signal input means C5 and C6. These are controlled by actuation of switches SW1–SW6, as previously described. The output of amplifier 40 changes the welding current by adjusting the pulse width modulating circuit 32 so that the instantaneous feedback current through resistors R5 or R6 equal the instantaneous current flow through resistors R1, R2, R3 and/or R4. The pulse width modulation tends to maintain the junction 52 at a zero current so that terminal 52a is grounded. The feedback signals and the command signals appear at the input of circuits C1–C6 as voltage signals. The command signals are negative voltage inputs illustrated as either potentiometers or variable voltage pulses such as control circuit C1. These voltages are created by a computer or microprocessor and can be changed in accordance with the desired profile for the various portions of the welding cycle as previously described. The voltage signal at the input of control circuit C5 is a voltage proportional to the sensed wattage of the arc. In like manner, the voltage input of control circuit C6 is the instantaneous sensed arc current which is illustrated as being 1.0 volts for each one-hundred amps. These various voltages according to the particular control circuits being operated at a given time during the welding cycle control the current flow to the summing junction 52 and at the negative summing junction 52a of error amplifier 40. The positive input to this amplifier is through resistor 42 to ground. In operation, the virtual ground input or terminal 52a of air amplifier 40 is always tending to approach zero volts. Consequently, no current can flow into or out of terminal 52a. Thus, positive current flowing toward input 52a must flow through the feedback network 44 to the output of amplifier 40 so that a voltage will not exist between the input 52 and ground. The output of the amplifier 40 will thus assume a negative voltage to pull the current from summing junction 52 so as to maintain the negative input 52a at virtual ground. Thus, the pulse width modulator is controlled to maintain a zero current at terminal 52a. In this manner, error amplifier 40 controls the total output current through the FET chopper including switch means 30 by changing of pulses through the pulse width modulator 32. Thus, the setting of the command voltage at any given time will be followed by a feedback voltage to offset the command voltage. In this manner, the output current follows the desired profile dictated by the setting of the command signals of circuits C1-C4. At equilibrium, the total current entering and leaving junction 52 is identical. In this manner, current being sensed or the wattage being sensed is identical to the setting determined by selective operation adjustment of circuits C1-C4.

Changes in the command signals may be done rapidly and several times during each welding cycle. As illustrated in FIG. 3, the voltage over a period of time can change at the input side of the command control circuits C1-C4. The PINCH control circuit C1, in practice, has a voltage which varies over time. As soon as the short circuit causes the PINCH command, the input voltage to the control circuit C1 is activated by closing of switch SW1 by the logic on line 50. To start, the voltage rises at a given rate until a voltage magnitude Y is reached. Thereafter, the rate of rise for the voltage during the PINCH can be adjusted until the fuse is detected. Thus, the output front as shown in FIG. 2 follows the input voltage profile shown at the input side of control circuit C1 in FIG. 3. These various values are all programmable and can be adjusted to change the current control during the PINCH cycle.

The various commands are generated by software and compared to digitized feedback signals in accordance with standard practice. Any number of command signals could be provided. In the illustrated embodiment of the invention, three basic control circuits are employed. The background current control circuit C4 is a command signal creating means and is used to balance the feedback current from control circuit C6 as previously discussed. In summary, various command signal creating means could be employed with one or more feedback control circuits C5, C6. If a voltage is to be controlled, as feedback control signal means relating to arc voltage could be incorporated into the selectively operated control circuit best illustrated in FIG. 3. All of this control operation is updated at a high frequency rate such as a rate exceeding 10 KHz and preferably at a rate of approximately 20 KHz. This driving system for the spatter control circuit could be employed for various other spatter control concepts or for otherwise adjusting the current, voltage and/or wattage during each of several successive welding cycles.

Having thus defined the invention, the following is claimed:

1. In a short circuiting arc welding apparatus comprising a single D.C. power supply means for causing a welding current to pass through a welding wire extending from a holder and between said wire and a workpiece at a molten metal pool on said workpiece, said current flowing in response to an arc voltage, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, wherein said welding cycles have a generally fixed frequency of repetition, the improvement comprising: said power supply includes means for applying a succession of input current pulses across said wire and workpiece at a pulse frequency substantially greater than said generally fixed frequency of repetition and pulse width changing means for adjusting current flow between said wire and said workpiece many times during each of said welding cycles, including a switch means for directing said put pulses across said wire and said workpiece, a high impedance branch circuit in parallel with said switch means and means for opening said switch means during said short circuit condition immediately before said molten metal ball is broken to initiate said arc.

2. The improvement as defined in claim 1, wherein said pulse frequency is greater than 10 KHz.

3. The improvement as defined in claim 2, wherein said pulse width changing means comprises feedback control means for changing said pulse width of said input current pulses in the direction to maintain a preselected electrical condition at a feedback junction and selectively actuated circuit means tending to change the electrical condition at said feedback junction during each of said welding cycles.

4. The improvement as defined in claim 6, wherein said junction is a summary junction.

5. The improvement as defined in claim 3, wherein said selectively actuated circuit means includes at least one feedback signal means controlled by a sensed parameter of said welding cycle with a first polarity and at least one command signal means having a selectively controlled parameter of the opposite polarity and means for summing said first and second polarity parameters.

6. The improvement as defined in claim 5, wherein said sensed parameter of said feedback signal means is a signal proportional to the arc current.

7. The improvement as defined in claim 5, wherein said sensed parameter of said feedback signal means is a signal proportional to the arc wattage.

8. The improvement as defined in claim 5, including two feedback signal means each controlled by different sensed parameters of said welding cycle and switch means for selecting only one of said feedback signal means during selected portions of said welding cycle.

9. The improvement as defined in claim 8, wherein said sensed parameters are sensed arc current and sensed arc wattage.

10. The improvement as defined in claim 3, wherein said selectively actuated circuit means includes input means for using the sensed arc wattage of said welding cycle to change said electrical condition.

11. The improvement as defined in claim 10, wherein said pulse width changing means comprises feedback control means for changing said pulse width of said input current pulses in the direction to maintain a preselected electrical condition at a feedback junction and selectively actuated circuit means tending to change the electrical condition at said feedback junction during each of said welding cycles.

12. The improvement as defined in claim 11, wherein said sensed parameters are sensed arc current and sensed arc wattage.

13. The improvement as defined in claim 3, wherein said selectively activated circuit means includes input means for using the sensed arc current of said welding cycle to change said electrical condition.

14. The improvement as defined in claim 13, wherein said pulse width changing means comprises feedback control means for changing said pulse width of said input current pulses in the direction to maintain a preselected electrical condition at a feedback junction and selectively actuated circuit means tending to change the electrical condition at said feedback junction during each of said welding cycles.

15. The improvement as defined in claim 14, wherein said sensed parameters are sensed arc current and sensed arc wattage.

16. The improvement as defined in claim 2, including two feedback signal means each controlled by different sensed parameters of said welding cycle and switch means for selecting only one of said feedback signal means during selected portions of said welding cycle.

17. The improvement as defined in claim 16, wherein said sensed parameters are sensed arc current and sensed arc wattage.

18. The improvement as defined in claim 1, wherein said pulse width changing means comprises feedback control means for changing said pulse width of said input current pulses in the direction to maintain a preselected electrical condition at a feedback junction and selectively actuated circuit means tending to change the electrical condition at said feedback junction during each of said welding cycles.

19. The improvement as defined in claim 18, wherein said junction is a summary junction.

20. The improvement as defined in claim 19, wherein said selectively actuated circuit means includes at least one feedback signal means controlled by a sensed parameter of said welding cycle with a first polarity and at least one comman signal means having a selectively controlled parameter of the opposite polarity and means for summing said first and second polarity parameters.

21. In an arc welding apparatus comprising a single D.C. power supply means for causing a welding current to pass through a welding wire extending from a holder and between said wire and a workpiece at a molten metal pool on said workpiece, said current flowing in response to an arc voltage in a succession of welding cycles, each of said welding cycles having a desired current profile including a plurality of controlled current pulses having different controlled current levels, said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece during one of said controlled current pulses by a necking action breaking said molten metal ball from said wire to initiate an arc in a subsequent welding cycle and a generally fixed frequency of repetition, the improvement comprising: said power supply includes means for applying a succession of input current pulses across said wire and workpiece at a pulse frequency substantially greater than said generally fixed frequency of repetition to create many of said input current pulses during each of said controlled current pulses and pulse width changing means for adjusting current flow between said wire and said workpiece many times during each of said controlled current pulses by changing the width of said input current pulses.

22. The improvement as defined in claim 21, wherein said pulse frequency is greater than 10 KHZ.

23. The improvement as defined in claim 22, wherein said pulse frequency is approximately 20 KHz.

24. The improvement as defined in claim 21, wherein said pulse width changing means comprises feedback control means for changing said pulse width of said input current pulses in the direction to maintain a preselected electrical condition at a feedback junction and selectively actuated circuit means tending to change the electrical condition at said feedback junction during each of said welding cycles.

25. In a short circuiting arc welding apparatus comprising a single D.C. power supply means for causing a welding current to pass through a welding wire extending from a holder and between said wire and a workpiece at a molten metal pool on said workpiece, said current flowing in response to an arc voltage, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, wherein said welding cycles have a generally fixed frequency of repetition, the improvement comprising: said power supply includes means for applying a succession of input current pulses across said wire and workpiece at a pulse frequency substantially greater than said generally fixed frequency of repetition and pulse width changing means for adjusting current flow between said wire and said workpiece many times during each of said welding cycles, said pulse width changing means comprises feedback control means for changing said pulse width of said input current pulses in the direction to maintain a preselected electrical condition at a feedback summing junction and selectively actuated circuit means tending to change the electrical condition at said feedback summing junction during each of said welding cycles, said selectively actuated circuit means includes at least one feedback signal means controlled by a sensed parameter of said welding cycle with a first polarity and at least one command signal means having a selectively controlled parameter of the opposite polarity and means for summing said first and second polarity parameters, said sensed parameter of said feedback signal means being a signal proportional to the arc wattage.

26. In a short circuiting arc welding apparatus comprising a single D.C. power supply means for causing a welding current to pass through a welding wire extending from a holder and between said wire and a workpiece at a molten metal pool on said workpiece, said current flowing in response to an arc voltage, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, wherein said welding cycles have a generally fixed frequency of repetition, the improvement comprising: said power supply includes means for applying a succession of input current pulses across said wire and workpiece at a pulse frequency substantially greater than said generally fixed frequency of repetition and pulse width changing means for adjusting current flow between said wire and said workpiece many times during each of said welding cycles, said pulse width changing means comprises feedback control means for changing said pulse width of said input current pulses in the direction to maintain a preselected electrical condition at a feedback summing junction and selectively actuated circuit means tending to change the electrical condition at said feedback summing junction during each of said welding cycles, said selectively actuated circuit means includes at least one feedback signal means controlled by a sensed parameter of said welding cycle with a first polarity and at least one command signal means having a selectively controlled parameter of the opposite polarity and means for summing said first and second polarity parameters, including two feedback signal means each controlled by different sensed parameters of said welding cycle and switch means for selecting only one of said feedback signal means during selected portions of said welding cycle.

27. The improvement as defined in claim 26, wherein said sensed parameters are sensed arc current and sensed arc wattage.

28. In an arc welding apparatus comprising a single D.C. power supply means for causing a welding current to pass through a welding wire extending from a holder and between said wire and a workpiece at a molten metal pool on said workpiece, said current flowing in response to an arc voltage in a succession of welding cycles, each of said welding cycles having a desired profile, said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycles and a generally fixed frequency of repetition, the improvement comprising: said power supply includes means for applying succession of input current pulses across said wire and workpiece at a pulse frequency substantially greater than said generally fixed frequency of repetition and pulse width changing means for adjusting current flow between said wire and said workpiece many times during each of said welding cycles, including a switch means for directing said input pulses across said wire and said workpiece, a high impedance branch circuit in parallel with said switch means and means for opening said switch means during a short circuit condition between said wire and said workpiece.

29. In a short circuiting arc welding apparatus comprising a single D.C. power supply means for causing a welding current to pass through a welding wire extending from a holder and between said wire and a workpiece at a molten metal pool on said workpiece, said current flowing in response to an arc voltage, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, wherein said welding cycles have a generally fixed frequency or repetition, the improvement comprising: said power supply includes means for applying a succession of input current pulses across said wire and workpiece at a pulse frequency substantially greater than said generally fixed frequency of repetition and pulse width changing means for adjusting current flow between said wire and said workpiece many times during each of said welding cycles, wherein said pulse width changing means comprises feedback control means for changing said pulse width of said input current pulses in the direction to maintain a preselected electrical condition at a feedback junction and selectively actuated circuit means for changing said preselected electrical condition at said feedback junction during each of said welding cycles.

30. The improvement as defined in claim 29, wherein said pulse frequency is greater than 10 KHz.

31. The improvement as defined in claim 30, wherein said pulse frequency is approximately 20 KHz.

32. The improvement as defined in claim 29, wherein said junction is a summary junction.

33. The improvement as defined in claim 29, wherein said selectively actuated circuit means includes at least one feedback signal means controlled by a sensed parameter of said welding cycle with a first polarity and at least one command signal means having a selectively controlled parameter of the opposite polarity and means for summing said first and second polarity parameters.

34. The improvement as defined in claim 33, wherein said sensed parameter of said feedback signal means is a signal proportional to the arc current.

35. The improvement as defined in claim 33, wherein said sensed parameter of said feedback signal means is a signal proportional to the arc wattage.

36. The improvement as defined in claim 33, including two feedback signal means each controlled by different sensed parameters of said welding cycle and switch means for selecting only one of said feedback signal means during selected portions of said welding cycle.

37. The improvement as defined in claim 36, wherein said sensed parameters are sensed arc current and sensed arc wattage.

* * * * *

UNITED STATES PATENT OFFICE
CERTIFICATE OF CORRECTION

Patent No. 4,972,064         Dated November 20, 1990

Inventor(s) Elliott K. Stava

It is certified that error appears in the above-identified patent and that said Letters Patent is hereby corrected as shown below:

Column 7, line 55, "q" should read --- a ---. Column 10, line 26, "Air" should read --- Error ---; line 57, "air" should read --- error ---. Claim 1, line 29, "put" should read --- input ---. Claim 4, line 1, "6" should read --- 3---. Claim 20, line 5, "comman" should read --- command ---.

Signed and Sealed this

Thirtieth Day of June, 1992

Attest:

DOUGLAS B. COMER

Attesting Officer     Acting Commissioner of Patents and Trademarks